(12) United States Patent
Jung et al.

(10) Patent No.: US 12,543,092 B2
(45) Date of Patent: Feb. 3, 2026

(54) LINK MANAGEMENT IN WIRELESS COMMUNICATIONS

(71) Applicant: LG Electronics Inc., Seoul (KR)

(72) Inventors: Sunghoon Jung, Seoul (KR); Hongsuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 414 days.

(21) Appl. No.: 18/075,084

(22) Filed: Dec. 5, 2022

(65) Prior Publication Data
US 2023/0345339 A1 Oct. 26, 2023

Related U.S. Application Data

(60) Provisional application No. 63/334,205, filed on Apr. 25, 2022.

(51) Int. Cl.
*H04W 36/30* (2009.01)
*H04W 36/00* (2009.01)
*H04W 36/08* (2009.01)

(52) U.S. Cl.
CPC ..... *H04W 36/305* (2018.08); *H04W 36/0061* (2013.01); *H04W 36/08* (2013.01)

(58) Field of Classification Search
CPC ............. H04W 36/0061; H04W 36/08; H04W 36/305
See application file for complete search history.

(56) References Cited

U.S. PATENT DOCUMENTS

| 2015/0181543 | A1 | 6/2015 | Hwang et al. | |
| 2020/0322856 | A1* | 10/2020 | Wang | H04W 36/04 |
| 2020/0383167 | A1* | 12/2020 | Sengupta | H04W 76/19 |
| 2021/0006456 | A1* | 1/2021 | Kim | H04W 72/23 |
| 2022/0022111 | A1 | 1/2022 | Zhang et al. | |
| 2022/0131591 | A1* | 4/2022 | Huang | H04W 76/19 |
| 2022/0132333 | A1* | 4/2022 | Mattam | H04W 76/30 |
| 2022/0294520 | A1* | 9/2022 | Tran | H04B 7/088 |
| 2023/0284145 | A1* | 9/2023 | Da Silva | H04W 52/0235 370/311 |
| 2023/0337020 | A1* | 10/2023 | Da Silva | H04W 24/04 |
| 2024/0155690 | A1* | 5/2024 | Wang | H04W 74/006 |

FOREIGN PATENT DOCUMENTS

WO 2021207391 10/2021

OTHER PUBLICATIONS

New WID on Further NR mobility enhancements, Mediatek, 3GPP TSG RAN Meeting #94e, Dec. 6-17, 2021, RP-213565.
Intel Corporation, "Discussion on the scope of Rel-18 Further NR mobility enhancements," 3GPP TSG RAN Meeting #94e, RP-213009, Dec. 2021.

* cited by examiner

*Primary Examiner* — Barry W Taylor
(74) *Attorney, Agent, or Firm* — BRYAN CAVE LEIGHTON PAISNER LLP

(57) ABSTRACT

The present disclosure relates to link management (LM) in wireless communications. According to an embodiment of the present disclosure, a method performed by a user equipment (UE) configured to operate in a wireless communication system comprises: receiving, from a network, a configuration for multiple candidate cells which are candidates for a serving cell; selecting at least one candidate cell among the multiple candidate cells; and performing a link management (LM) operation on the at least one candidate cell.

18 Claims, 14 Drawing Sheets

LINK MANAGEMENT IN WIRELESS COMMUNICATIONS

CROSS-REFERENCE TO RELATED APPLICATIONS

This application claims the benefit of U.S. Provisional Application No. 63/334,205, filed on Apr. 25, 2022, the contents of which are all hereby incorporated by reference herein in their entirety.

TECHNICAL FIELD

The present disclosure relates to link management (LM) in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, a user equipment (UE) may perform a link management (LM) on multiple cells and/or multiple cell groups (CGs). The link management may comprise radio resource management (RRM), radio link monitoring (RLM), beam failure detection (BFD) management and/or uplink (UL) timing management. Since a large number of cells/CGs can be configured to the UE, the UE may consume lots of power to perform LM operation.

SUMMARY

An aspect of the present disclosure is to provide method and apparatus for a link management (LM) in wireless communications.

Another aspect of the present disclosure is to provide method and apparatus for LM operation when plurality of cells/CGs are configured in wireless communications.

According to an embodiment of the present disclosure, a method performed by a user equipment (UE) configured to operate in a wireless communication system comprises: receiving, from a network, a configuration for multiple candidate cells which are candidates for a serving cell; selecting at least one candidate cell among the multiple candidate cells; and performing a link management (LM) operation on the at least one candidate cell.

According to an embodiment of the present disclosure, a method performed by a network node configured to operate in a wireless communication system comprises: transmitting, to a UE, a configuration for multiple candidate cells which are candidates for a serving cell; transmitting, to the UE, a configuration for a link management (LM) operation on the multiple candidate cells; and receiving, from the UE, a result of the LM operation on at least one candidate cell among the multiple candidate cells.

According to various embodiments of the present disclosure, apparatuses implementing the above methods are provided.

The present disclosure can have various advantageous effects.

For example, UE performs selective LM operations on at least part of cells/CGs so that power consumption can be reduced, and UE can perform mobility with lower power consumption.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
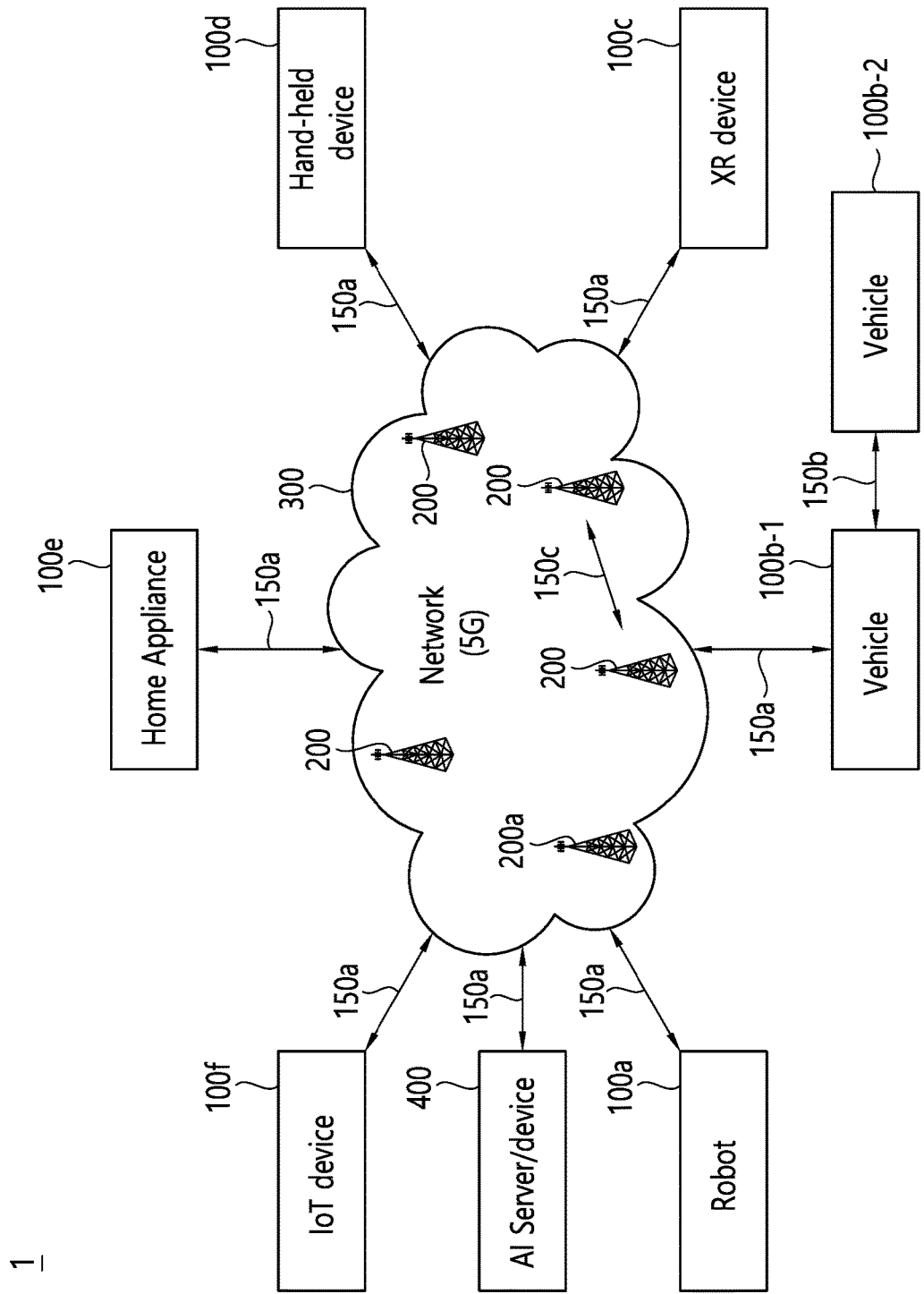
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
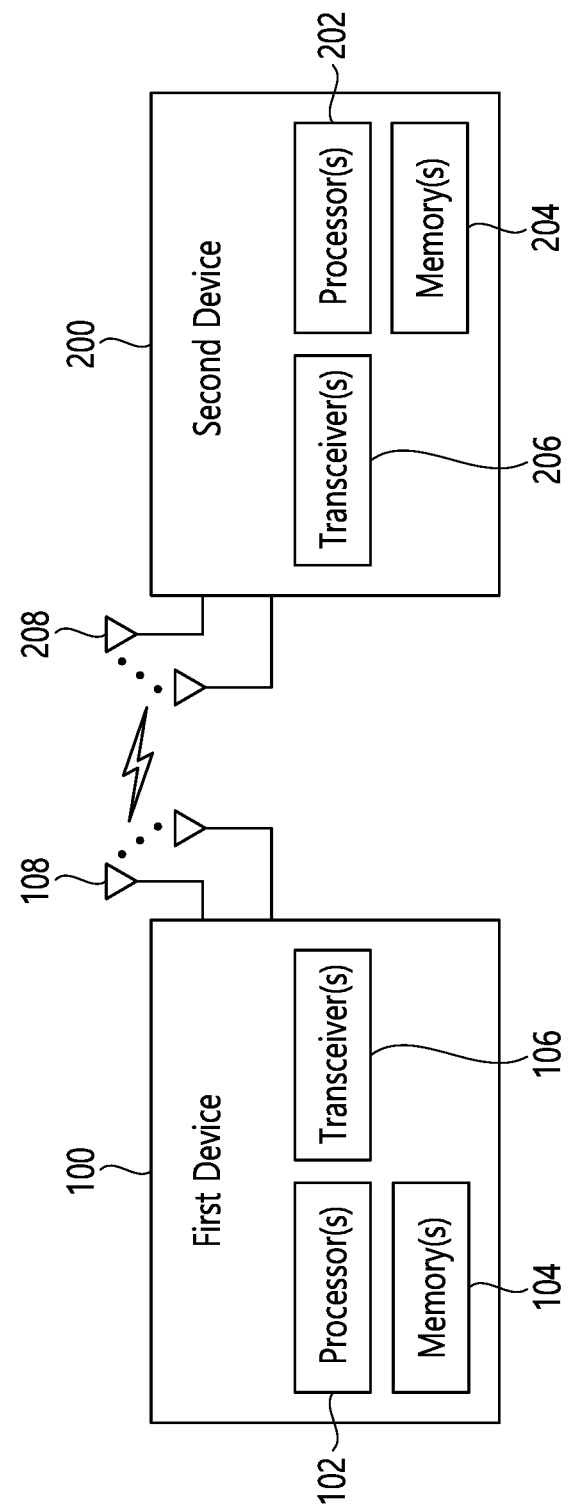
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
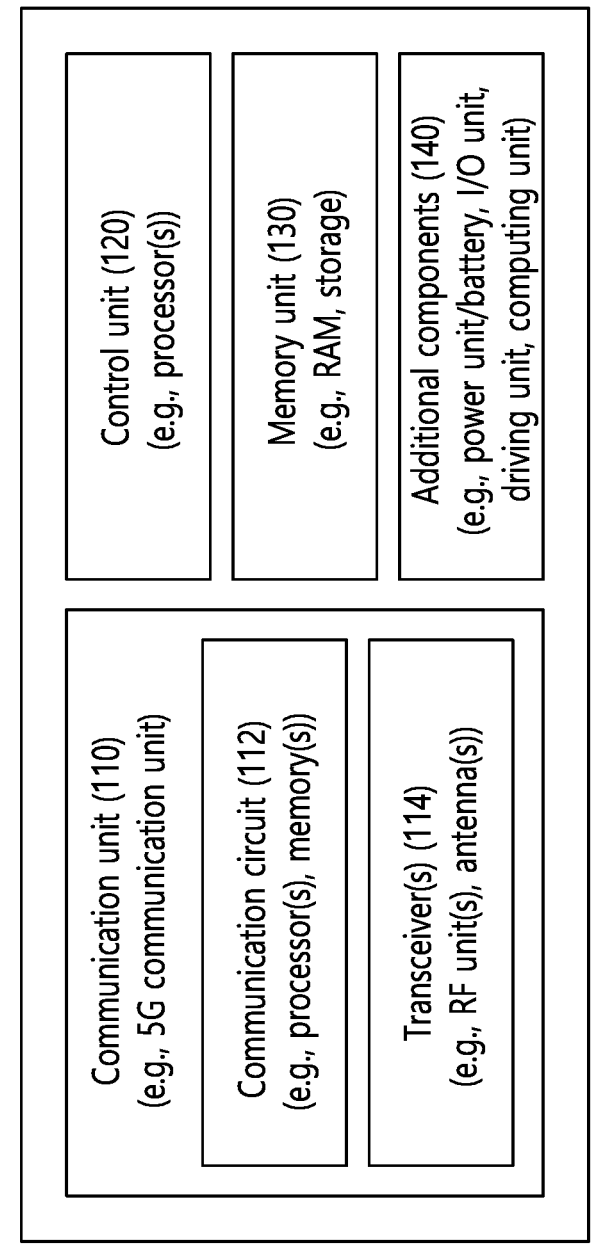
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
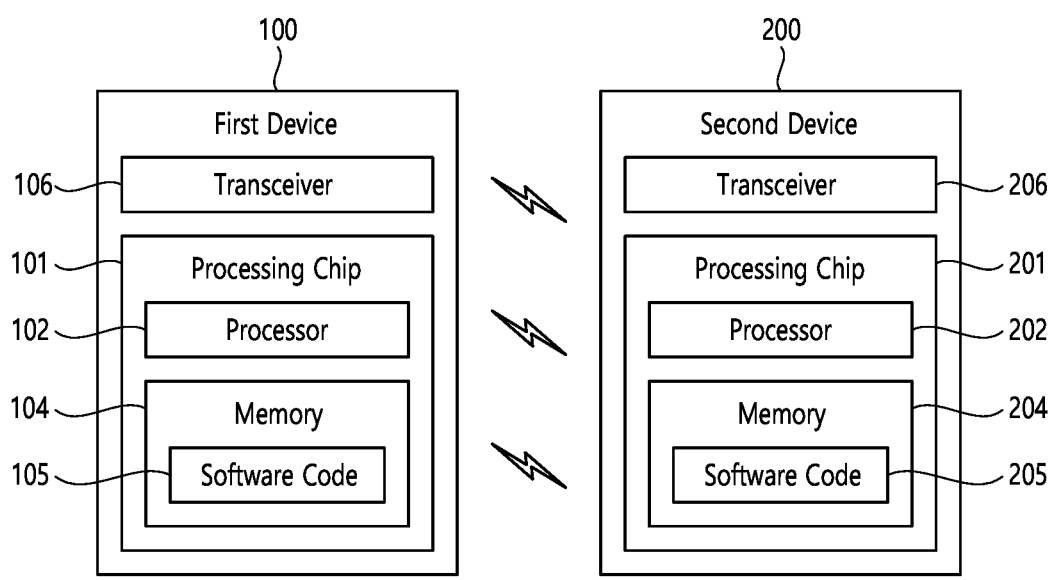
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
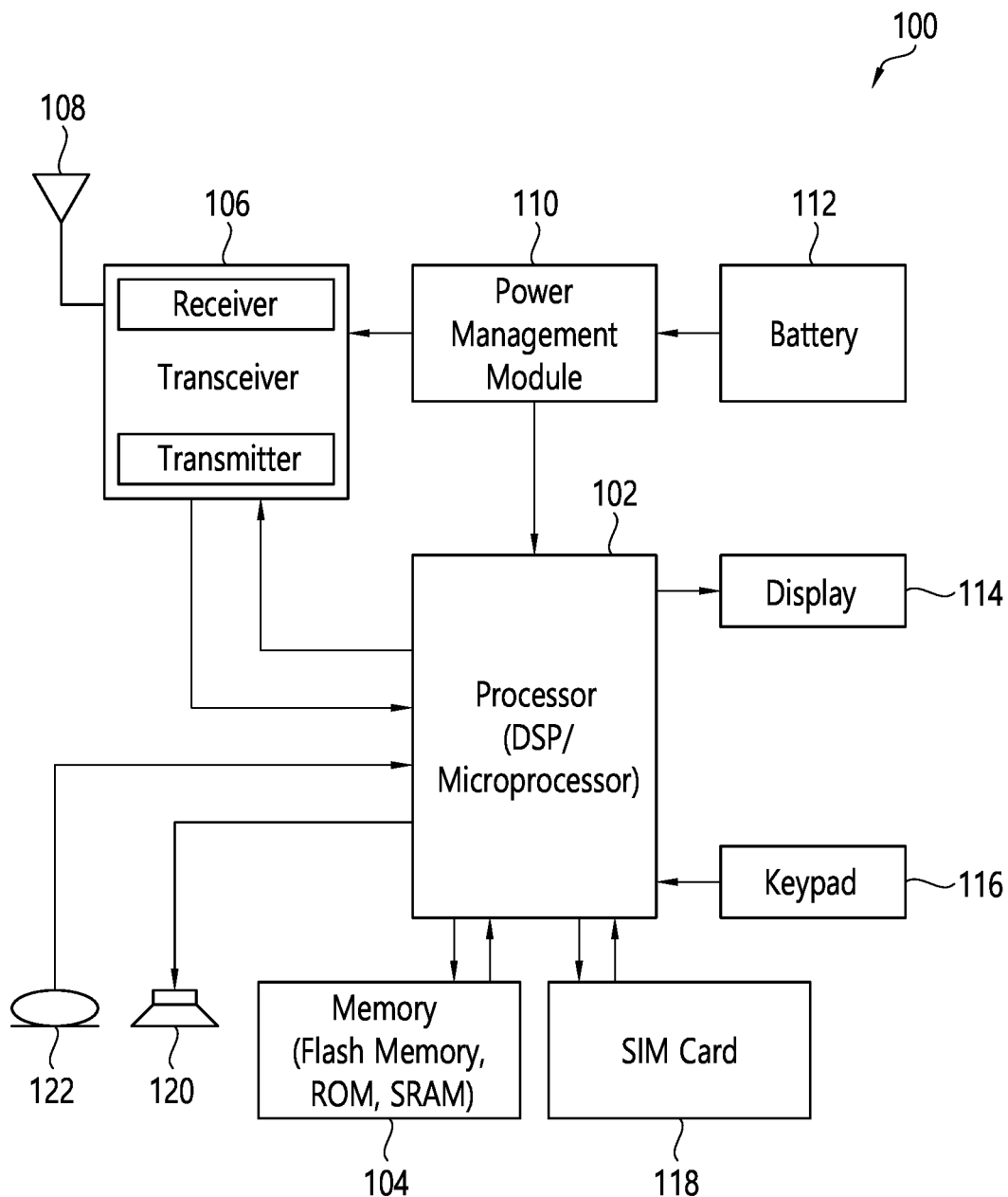
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
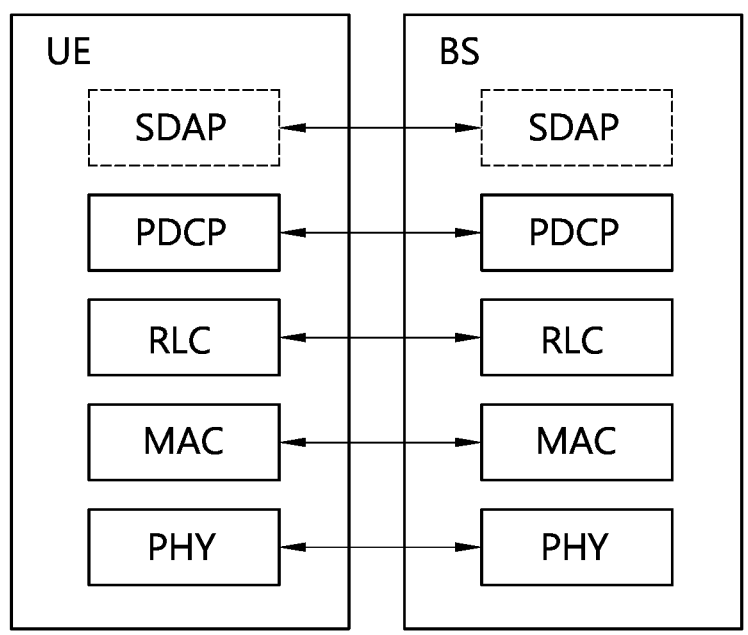
FIGS. 6 and 7 show an example of protocol stacks in a 3GPP based wireless communication system to which implementations of the present disclosure is applied.
Figure 7:
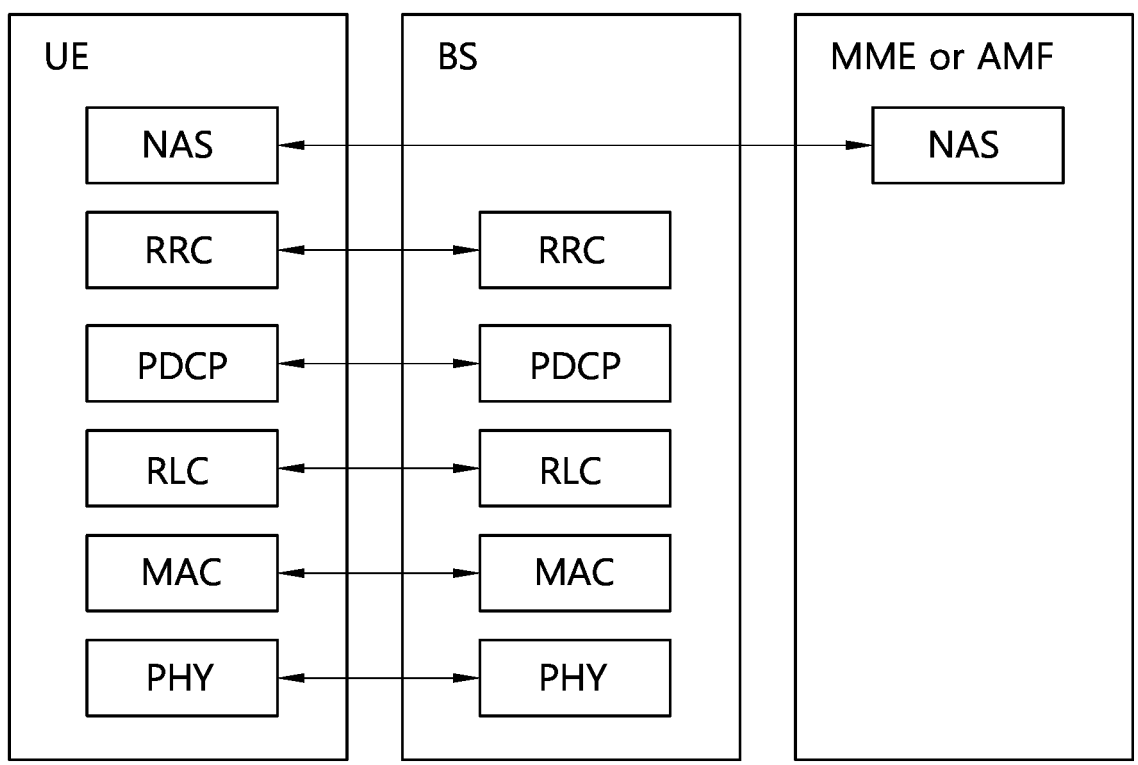

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information.

Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
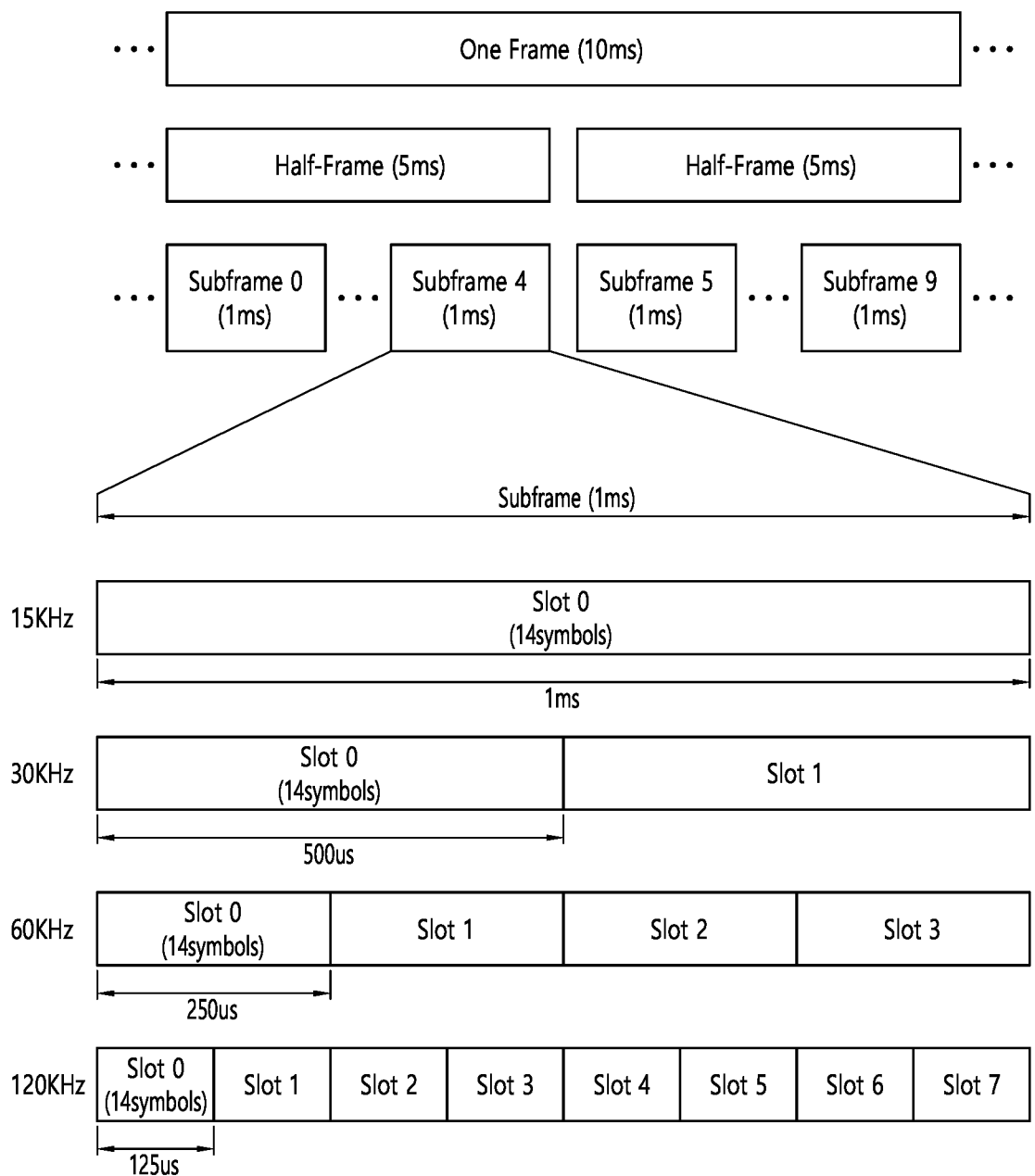
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6

GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
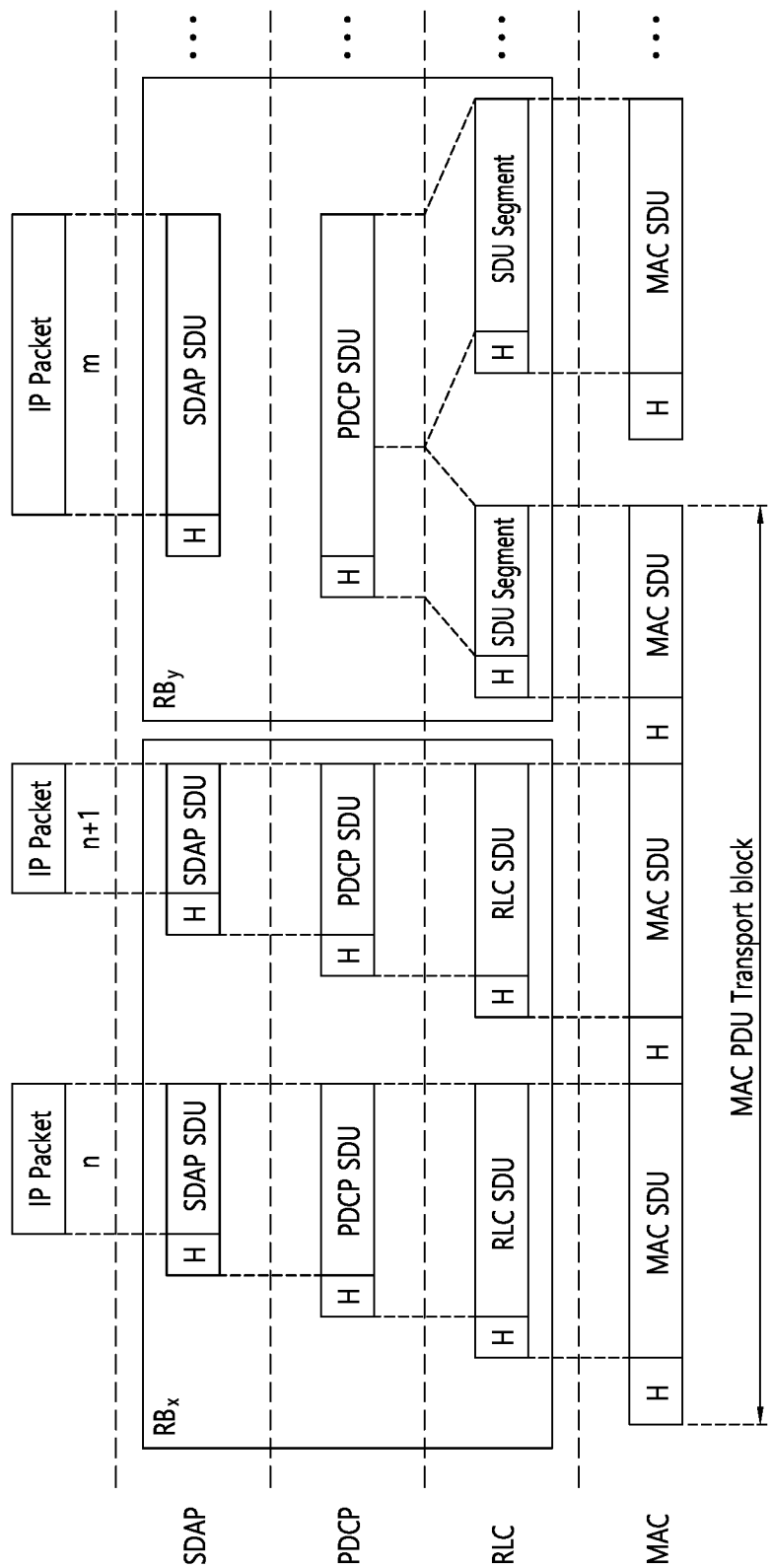
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Figure 10:
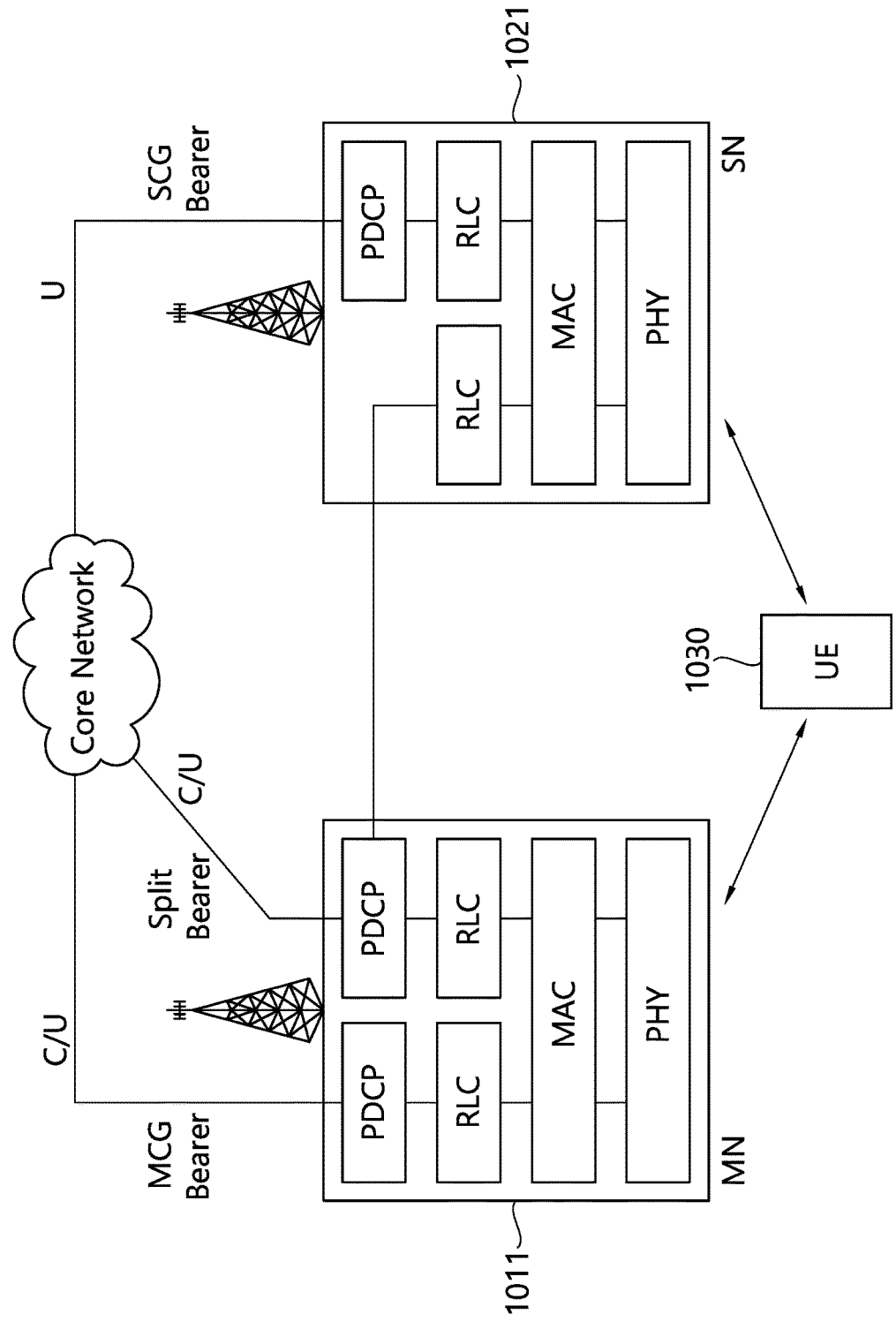
FIG. 10 shows an example of a dual connectivity (DC) architecture to which technical features of the present disclosure can be applied.

FIG. 10 shows an example of a dual connectivity (DC) architecture to which technical features of the present disclosure can be applied.

Referring to FIG. 10, MN 1011, SN 1021, and a UE 1030 communicating with both the MN 1011 and the SN 1021 are illustrated. As illustrated in FIG. 10, DC refers to a scheme in which a UE (e.g., UE 1030) utilizes radio resources provided by at least two RAN nodes comprising a MN (e.g., MN 1011) and one or more SNs (e.g., SN 1021). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes). MN (e.g., MN 1011) refers to a main RAN node providing services to a UE in DC situation. SN (e.g., SN 1021) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 10, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 10, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 10, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 10, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Hereafter, a link management (LM) operation is described.

The LM operation or LM may comprise at least one of radio resource management (RRM), radio link monitoring (RLM), beam management (BM) or uplink (UL) timing management.

The RRM may comprise performing a measurement one or more reference signals (e.g., synchronization signal/physical broadcast channel (SS/PBCH) block and/or channel state information-reference signal (CSI-RS)) in RSRP/RSRQ quantity for various reasons such as mobility (e.g., connected mode mobility including PCell change/PSCell change/PSCell addition, and/or idle mode mobility including cell reselection).

The RLM (or, cell-RLM) may comprise one or more operations for detecting an RLF on a cell. For example, the RLM may comprise at least one of i) monitoring the number of out-of-sync indications for an SpCell; or ii) monitoring a running state of a timer which is started from when the number of consecutive out-of-sync indications for the SpCell reaches a configured threshold number. If the timer expires (i.e., running state=expire), the UE may detect an RLF on the corresponding SpCell.

The BM may comprise one or more operations for beam failure detection on one or more beams associated with a cell. For example, the BM may comprise monitoring the number of (consecutive) beam failure instance indications during a configured time duration. If the number of (consecutive) beam failure instance indications reaches a configured threshold number during the configured time duration, the UE may detect a beam failure.

The information element (IE) RadioLinkMonitoringConfig may be used to configure the RLM and/or BM. The RadioLinkMonitoringConfig may comprise fields as illustrated in table 5 below:

TABLE 5

```
-- ASN1START
-- TAG-RADIOLINKMONITORINGCONFIG-START
RadioLinkMonitoringConfig ::=        SEQUENCE {
    failureDetectionResourcesToAddModList              SEQUENCE
(SIZE(1..maxNrofFailureDetectionResources)) OF RadioLinkMonitoringRS
OPTIONAL, -- Need N
    failureDetectionResourcesToReleaseList             SEQUENCE
(SIZE(1..maxNrofFailureDetectionResources)) OF RadioLinkMonitoringRS-Id
OPTIONAL, -- Need N
    beamFailureInstanceMaxCount               ENUMERATED {n1, n2, n3,
n4, n5, n6, n8, n10}            OPTIONAL, -- Need R
    beamFailureDetectionTimer                 ENUMERATED {pbfd1,
pbfd2, pbfd3, pbfd4, pbfd5, pbfd6, pbfd8, pbfd10} OPTIONAL, -- Need R
    ...
}
RadioLinkMonitoringRS ::=             SEQUENCE {
    radioLinkMonitoringRS-Id              RadioLinkMonitoringRS-Id,
    purpose                               ENUMERATED {beamFailure,
```

TABLE 5-continued

```
rlf, both},
    detectionResource              CHOICE {
        ssb-Index                       SSB-Index,
        csi-RS-Index                    NZP-CSI-RS-ResourceId
    },
    ...
}
-- TAG-RADIOLINKMONITORINGCONFIG-STOP
-- ASN1STOP
```

In table 5:

- The beamFailureDetectionTimer may be a timer for a beam failure detection;
- The beamFailureInstanceMaxCount may determine after how many beam failure events the UE triggers beam failure recovery;
- The failureDetectionResourcesToAddModList may be a list of reference signals for detecting a beam failure and/or a cell level radio link failure (RLF). The network may configure at most two detectionResources per BWP for the purpose beamFailure or both. If no RSs are provided for the purpose of beam failure detection, the UE may perform beam monitoring based on the activated TCI-State for PDCCH (i.e., beam and/or RS which is activated as being quasi co-located (QCL'ed) with the PDCCH). If no RSs are provided for the purpose of RLF detection, the UE may perform a cell-RLM based on the activated TCI-State of PDCCH (i.e., RS which is activated as being QCL'ed with the PDCCH). The network may ensure that the UE has a suitable set of reference signals for performing cell-RLM;
- The detectionResource may indicate a reference signal that the UE shall use for RLF detection or beam failure detection (depending on the indicated purpose). Only periodic 1-port CSI-RS for beam monitoring (BM) can be configured on SCell for beam failure detection purpose; and
- The purpose may determine whether the UE shall monitor the associated reference signal for the purpose of cell-RLF and/or beam failure detection. For SCell, network may only configure the value to beamFailure.

Further, the IE RLF-TimersAndConstants may be used to configure UE specific timers and constants related to detecting an RLF. The RLF-TimersAndConstants may comprise fields as illustrated in table 6 below:

TABLE 6

```
-- ASN1START
-- TAG-RLF-TIMERSANDCONSTANTS-START
RLF-TimersAndConstants ::=    SEQUENCE {
    t310                          ENUMERATED {ms0, ms50,
ms100, ms200, ms500, ms1000, ms2000, ms4000, ms6000},
    n310                          ENUMERATED {n1, n2, n3, n4,
n6, n8, n10, n20},
    n311                          ENUMERATED {n1, n2, n3, n4,
n5, n6, n8, n10},
    ...,
    [[
    t311                          ENUMERATED {ms1000,
ms3000, ms5000, ms10000, ms15000, ms20000, ms30000}
    ]]
}
-- TAG-RLF-TIMERSANDCONSTANTS-STOP
-- ASN1STOP
```

Hereinafter, RLF related actions are described.

To detect physical layer problems in RRC_CONNECTED, the UE shall:

1> if any DAPS bearer is configured, upon receiving N310 consecutive "out-of-sync" indications for the source SpCell from lower layers while T304 is running
2> start timer T310 for the sourceSpCell.
1> upon receiving N310 consecutive "out-of-sync" indications for the SpCell from lower layers while neither T300, T301, T304, T311, T316 nor T319 are running
2> start timer T310 for the corresponding SpCell.

Upon receiving N311 consecutive "in-sync" indications for the SpCell from lower layers while T310 is running, the UE shall:

1> stop timer T310 for the corresponding SpCell, and determine that the physical layer problems are recovered.
1> stop timer T312 for the corresponding SpCell, if running, and determine that the physical layer problems are recovered.

In this case, the UE maintains the RRC connection without explicit signalling, i.e., the UE maintains the entire radio resource configuration.

Periods in time where neither "in-sync" nor "out-of-sync" is reported by L1 (i.e., physical layer) do not affect the evaluation of the number of consecutive "in-sync" or "out-of-sync" indications.

To detect an RLF, the UE shall:

1> if any DAPS bearer is configured:
2> upon T310 expiry in source SpCell; or
2> upon random access problem indication from source MCG MAC; or
2> upon indication from source MCG RLC that the maximum number of retransmissions has been reached; or
2> upon consistent uplink LBT failure indication from source MCG MAC:
3> consider radio link failure to be detected for the source MCG i.e. source RLF;
3> suspend the transmission of all DRBs in the source MCG;
3> reset MAC for the source MCG;
3> release the source connection.
1> else:
2> upon T310 expiry in PCell; or
2> upon T312 expiry in PCell; or
2> upon random access problem indication from MCG MAC while neither T300, T301, T304, T311 nor T319 are running; or
2> upon indication from MCG RLC that the maximum number of retransmissions has been reached; or
2> if connected as an IAB-node, upon BH RLF indication received on BAP entity from the MCG; or
2> upon consistent uplink LBT failure indication from MCG MAC while T304 is not running:

3> if the indication is from MCG RLC and CA duplication is configured and activated, and for the corresponding logical channel allowedServingCells only includes SCell(s):
4> initiate the failure information procedure to report RLC failure.
3> else:
4> consider radio link failure to be detected for the MCG i.e. RLF;
4> discard any segments of segmented RRC messages;
4> if AS security has not been activated:
5> perform the actions upon going to RRC_IDLE, with release cause 'other';—
4> else if AS security has been activated but SRB2 and at least one DRB or, for IAB, SRB2, have not been setup:
5> store the radio link failure information in the VarRLF-Report;
5> perform the actions upon going to RRC_IDLE, with release cause 'RRC connection failure';
4> else:
5> store the radio link failure information in the VarRLF-Report;
5> if T316 is configured; and
5> if SCG transmission is not suspended; and
5> if PSCell change is not ongoing (i.e. timer T304 for the NR PSCell is not running in case of NR-DC or timer T307 of the E-UTRA PSCell is not running in NE-DC):
6> initiate the MCG failure information procedure to report MCG radio link failure.
5> else:
6> initiate the connection re-establishment procedure.

The UE may discard the radio link failure information, i.e., release the UE variable VarRLF-Report, 48 hours after the radio link failure is detected.

The UE shall:
1> upon T310 expiry in PSCell; or
1> upon T312 expiry in PSCell; or
1> upon random access problem indication from SCG MAC; or
1> upon indication from SCG RLC that the maximum number of retransmissions has been reached; or
1> if connected as an IAB-node, upon BH RLF indication received on BAP entity from the SCG; or
1> upon consistent uplink LBT failure indication from SCG MAC:
2> if the indication is from SCG RLC and CA duplication is configured and activated; and for the corresponding logical channel allowedServingCells only includes SCell(s):
3> initiate the failure information procedure to report RLC failure.
2> else if MCG transmission is not suspended:
3> consider radio link failure to be detected for the SCG, i.e. SCG RLF;
3> initiate the SCG failure information procedure to report SCG radio link failure.
2> else:
3> if the UE is in NR-DC:
4> initiate the connection re-establishment procedure;
3> else (the UE is in (NG)EN-DC):
4> initiate the connection re-establishment procedure;

Hereinafter, beam failure detection and recovery procedure are described.

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure may be detected by counting beam failure instance indications from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

For the beam failure detection procedure, the UE variable BFI_COUNTER (per Serving Cell) may be used. The BFI_COUNTER may be a counter for beam failure instance indication which is initially set to 0.

The MAC entity shall for each Serving Cell configured for beam failure detection:
1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> consider a beam failure to be detected;
3> if the Serving Cell is SCell:
4> trigger a BFR for this Serving Cell;
3> else:
4> initiate a Random Access procedure on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
2> set BFI_COUNTER to 0.
1> if the Serving Cell is SpCell and the Random Access procedure initiated for SpCell beam failure recovery is successfully completed:
2> set BFI_COUNTER to 0;
2> stop the beamFailureRecoveryTimer, if configured;
2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated:
2> set BFI_COUNTER to 0;
2> consider the Beam Failure Recovery procedure successfully completed and cancel all the triggered BFRs for this Serving Cell.

The MAC entity shall:
1> if the Beam Failure Recovery procedure determines that at least one BFR has been triggered and not cancelled for an SCell for which evaluation of the candidate beams has been completed:
2> if UL-SCH resources are available for a new transmission and if the UL-SCH resources can accommodate the BFR MAC CE plus its subheader as a result of LCP:
3> instruct the Multiplexing and Assembly procedure to generate the BFR MAC CE.
2> else if UL-SCH resources are available for a new transmission and if the UL-SCH resources can accommodate the Truncated BFR MAC CE plus its subheader as a result of LCP:
3> instruct the Multiplexing and Assembly procedure to generate the Truncated BFR MAC CE.

2> else:
   3> trigger the SR for SCell beam failure recovery for each SCell for which BFR has been triggered, not cancelled, and for which evaluation of the candidate beams has been completed.

All BFRs triggered for an SCell shall be cancelled when a MAC PDU is transmitted and this PDU includes a BFR MAC CE or Truncated BFR MAC CE which contains beam failure information of that SCell.

The UL timing management may comprise at least one of i) monitoring a running state of a time alignment timer which specifies how long the associated cells are considered to be uplink time aligned; or ii) transmitting, to a network, a signal for requesting a UL timing adjustment command including adjustment value for UL timing alignment (e.g., RACH preamble/SRS).

In some implementations, a UE may consider a cell group as being in a deactivated state/dormant state for power saving. For example, the UE may consider the cell group as being in the deactivated/dormant state if the UE receives a command via MAC CE or DCI from a network. For another example, the UE may consider the cell group as being in the deactivated/dormant state if a pre-determined condition is met (e.g., there is no traffic activity on UL and/or DL on the cell group for a pre-determined period). The UE may consider the cell group as being in an activated state if the UE receives a command via MAC CE or DCI from a network, a deactivation/dormant period on the cell group expires or a random access (RA) is triggered on the cell group during the deactivated/dormant state. The cell group may comprise MCG and/or SCG.

In some implementations, a UE may consider a BWP as being in a deactivated state/dormant state for power saving. For example, the UE may consider the BWP as being in the deactivated/dormant state if the UE receives a command via MAC CE or DCI from a network. For another example, the UE may consider the BWP as being in the deactivated/dormant state if a pre-determined condition is met (e.g., there is no traffic activity on UL and/or DL on the BWP for a pre-determined period). The UE may consider the BWP as being in an activated state if the UE receives a command via MAC CE or DCI from a network, a deactivation/dormant period on the BWP expires or a random access (RA) is triggered on the BWP during the deactivated/dormant state.

The activated state may refer to a state in which the UE monitors a first set of resources for a control channel on the cell group/BWP. For example, in the activated state, the UE monitors downlink control channel (PDCCH) for downlink scheduling, performs CSI measurements, performs CSI reporting, if needed, and/or has opportunities to request uplink scheduling, if needed.

The deactivated state may refer to a state in which the UE monitors a second set of resources for a control channel on the cell group/BWP, or does not monitor a control channel on the cell group/BWP. For example, in the deactivated state, the UE does not monitor downlink control channel (PDCCH) for downlink scheduling, does not perform CSI measurements and/or does not perform CSI reporting.

The first/second set of resources for a control channel may comprise a control resource set (CORESET) and/or one or more PDCCHs. The second set of resources may comprise sparser resources than the first set of resources.

The dormant state may refer to a state in which the UE does not monitor downlink control channel (PDCCH) for downlink scheduling, but perform CSI measurements. The UE may not be required to perform CSI reporting in a dormant state to save power consumption. Dormant state may be classified as a sub-state of the activated state.

For a UE configured with MCG and SCG, the UE may deactivate SCG (i.e., consider the SCG as being in a deactivated/dormant state) for power saving. While the SCG is deactivated, the UE may need to keep radio link monitoring to check if the SCG is usable. If a failure (e.g., SCG failure/beam failure) is detected, the UE may need to report the failure to network via MCG or to perform recovery procedure. Since the radio link monitoring requires a consistent UE power consumption, more power-efficient radio link monitoring is beneficial for deactivated SCG. Since link failure report may require extra UE power consumption for uplink transmission, relaxation of link failure criteria for deactivated SCG may be beneficial for power saving.

Upon reception of the RRCReconfiguration, the UE shall:
1> if the UE is configured with E-UTRA nr-SecondaryCellGroupConfig (UE in (NG)EN-DC):
  2> if the RRCReconfiguration message was received via E-UTRA SRB1; or
  2> if the RRCReconfiguration message was received via E-UTRA RRC message RRCConnectionReconfiguration within MobilityFromNRCommand (handover from NR standalone to (NG)EN-DC);
    3> if the scg-State is not included in the E-UTRA RRCConnectionReconfiguration message or E-UTRA RRCConnectionResume message containing the RRCReconfiguration message:
      4> perform SCG activation;
      4> if reconfigurationWithSync was included in spCellConfig of an SCG:
        5> initiate the Random Access procedure on the PSCell;
      4> else if the SCG was deactivated before the reception of the E-UTRA RRC message containing the RRCReconfiguration message:
        5> if bfd-and-RLM was not configured to true before the reception of the E-UTRA RRCConnectionReconfiguration or RRCConnectionResume message containing the RRCReconfiguration message or if lower layers indicate that a Random Access procedure is needed for SCG activation:
          6> initiate the Random Access procedure on the SpCell;
    3> else:
      4> perform SCG deactivation.
1> else if the RRCReconfiguration message was received via SRB1 within the nr-SCG within mrdc-SecondaryCellGroup (UE in NR-DC, mrdc-SecondaryCellGroup was received in RRCReconfiguration or RRCResume via SRB1):
  2> if the RRCReconfiguration is applied due to a conditional reconfiguration execution for CPC which is configured via conditionalReconfiguration contained in nr-SCG within mrdc-SecondaryCellGroup:
    3> submit the RRCReconfigurationComplete message via the NR MCG embedded in NR RRC message ULInformationTransferMRDC.
  2> if the scg-State is not included in the RRCReconfiguration or RRCResume message containing the RRCReconfiguration message:
    3> if the SCG was deactivated before the reception of the NR RRC message containing the RRCReconfiguration message:
      4> perform SCG activation;
    3> if reconfigurationWithSync was included in spCellConfig in nr-SCG:
      4> initiate the Random Access procedure on the PSCell;

3> else if the SCG was deactivated before the reception of the NR RRC message containing the RRCReconfiguration message:
4> if bfd-and-RLM was not configured to true before the reception of the RRCReconfiguration or RRCResume message containing the RRCReconfiguration message; or
4> if lower layers indicate that a Random Access procedure is needed for SCG activation:
5> initiate the Random Access procedure on the PSCell;
2> else
3> perform SCG deactivation.
1> if RRCReconfiguration was received via SRB1:
2> if the UE is in NR-DC and;
2> if the RRCReconfiguration does not include the mrdc-SecondaryCellGroupConfig:
3> if the RRCReconfiguration includes the scg-State:
4> perform SCG deactivation;
3> else:
4> perform SCG activation without SN message.
Upon reception of the RRCResume, the UE shall:
1> if the RRCResume includes the mrdc-SecondaryCellGroup:
2> if the received mrdc-SecondaryCellGroup is set to nr-SCG:
3> if the RRCResume includes the scg-State:
4> perform SCG deactivation;
3> else:
4> perform SCG activation.
Upon initiating the SCG activation and/or while performing the SCG activation, the UE shall:
1> if the UE is configured with an SCG after receiving the message for which this procedure is initiated:
2> if the UE was configured with a deactivated SCG before receiving the message for which this procedure is initiated:
3> consider the SCG to be activated;
3> resume performing radio link monitoring on the SCG, if previously stopped;
3> indicate to lower layers to resume beam failure detection on the PSCell, if previously stopped;
3> indicate to lower layers that the SCG is activated.
Upon initiating the SCG deactivation and/or while performing the SCG deactivation, the UE shall:
1> consider the SCG to be deactivated;
1> indicate to lower layers that the SCG is deactivated;
1> if bfd-and-RLM is configured to true:
2> perform radio link monitoring on the SCG;
2> indicate to lower layers to perform beam failure detection on the PSCell;
1> else:
2> stop radio link monitoring on the SCG;
2> indicate to lower layers to stop beam failure detection on the PSCell;
2> stop timer T310 for this cell group, if running;
2> stop timer T312 for this cell group, if running;
2> reset the counters N310 and N311;
1> if the UE was in RRC_CONNECTED and the SCG was activated before receiving the message for which this procedure is initiated:
2> if SRB3 was configured before the reception of the RRCReconfiguration or of the RRCConnectionReconfiguration and SRB3 is not to be released according to any RadioBearerConfig included in the RRCReconfiguration or in the RRCConnectionReconfiguration as specified in TS 36.331[10]:
3> trigger the PDCP entity of SRB3 to perform SDU discard;
3> re-establish the RLC entity of SRB3.
Upon initiating the SCG activation without SN message and/or while performing the SCG activation without SN message, the UE shall:
1> if the SCG was deactivated before the reception of the RRCReconfiguration message or the E-UTRA RRC-ConnectionReconfiguration message for which this procedure is executed:
2> consider the SCG to be activated;
2> indicate to lower layers that the SCG is activated;
2> if bfd-and-RLM was not configured to true before the reception of the RRCReconfiguration message or the E-UTRA RRCConnectionReconfiguration message for which the procedure invoking this clause is executed; or
2> if lower layers indicate that a Random Access procedure is needed for SCG activation:
3> initiate the Random Access procedure on the PSCell.
For the configured SCG, the MAC entity shall:
1> if upper layers indicate that SCG is activated:
2> if BFI_COUNTER>=beamFailureInstanceMaxCount for the PSCell or the timeAlignmentTimer associated with PTAG is not running
3> indicate to upper layers that a Random Access Procedure) is needed for SCG activation.
2> else:
3> activate the SCG according to the timing for direct SCG activation.
2> (re-)initialize any suspended configured uplink grants of configured grant Type 1 associated with this PSCell according to the stored configuration, if any, and to start in the symbol;
2> apply normal SCG operation including:
3> SRS transmissions on the PSCell;
3> CSI reporting for the PSCell;
3> PDCCH monitoring on the PSCell;
3> PUCCH transmissions on the PSCell;
3> transmit on RACH on the PSCell;
3> initialize Bj for each logical channel to zero.
1> else if upper layers indicate that the SCG is deactivated:
2> deactivate all the SCells of the SCG;
2> deactivate SCG according to the timing;
2> clear any configured downlink assignment and any configured uplink grant Type 2 associated with the PSCell respectively;
2> suspend any configured uplink grant Type 1 associated with the PSCell;
2> reset MAC.
1> if the SCG is deactivated:
2> not transmit SRS on the PSCell;
2> not report CSI for the PSCell;
2> not transmit on UL-SCH on the PSCell;
2> not transmit PUCCH on the PSCell;
2> not transmit on RACH on the PSCell;
2> not monitor the PDCCH on the PSCell.

In the disclosure, the terms "regular cell" and "candidate cell" are used. The regular cell may be a cell for which UE has available configuration parameters and/or has applied the configuration parameters. The candidate cell may be a cell which is a candidate to become the regular cell.

For example, the regular cell may be a serving cell while the candidate cell may be a non-serving cell which is a candidate to become the serving cell. The serving cell may comprise PCell/PSCell/SCell.

For another example, the regular cell may be an activated serving cell while the candidate cell may be i) a non-serving cell, or ii) a deactivated serving cell, which is a candidate to become the activated serving cell. When the serving cell is activated, the UE may monitor a first set of resources for a control channel on the serving cell. When the serving cell is deactivated, the UE may monitor a second set of resources sparser than the first set for a control channel on the serving cell, or does not monitor a control channel on the serving cell.

In the disclosure, the terms "regular CG" and "candidate CG" are used. The regular CG may be a CG for which UE has available configuration parameters or has applied the configuration parameters.

For example, the regular CG may be a serving CG while the candidate CG may be a non-serving CG which is a candidate to become the serving CG. The serving CG may comprise at least one of MCG or SCG.

For another example, the regular CG may be an activated serving CG while the candidate CG may be i) a non-serving CG, or ii) a deactivated serving CG, which is a candidate to become the activated serving CG.

Meanwhile, for each configured CG, UE may be required to perform link management operations including at least one of radio link monitoring, beam failure detection or uplink timing management on each CG.

UE may be configured with one or more candidate CG, where the candidate CG is yet a regular CG but can be a candidate to become a regular CG. If link management operations are executed on those candidate CGs, UE can detect link status (e.g., link failure on the CG or not) and/or beam status (e.g., beam failure or not, if a certain beam possibly with beam change is maintained, on the CG or on a representative cell of the CG) and/or uplink timing status (e.g., UE's uplink transmission timing is aligned with network timing or not, possibly with uplink transmission timing control on the CG or on a representative cell of the CG) of all those CGs. Then when one of those candidates become a regular CG, optimized switching from candidate CG to a regular CG can be achieved based on the detected status of the CG.

However, execution of link management operations on all candidate CGs results in significant increase of UE power consumption and UE complexity.

Therefore, if UE is configured with a list of candidate CGs for a serving CG, UE may select a subset of the CGs and perform operations to detect and/or maintain link status of the CG, only on the selected CG. If UE is configured with a list of candidate cells, UE may select a subset of the cells and perform operations to detect and/or maintain link status of the CG, only on the selected cell.

Figure 11:
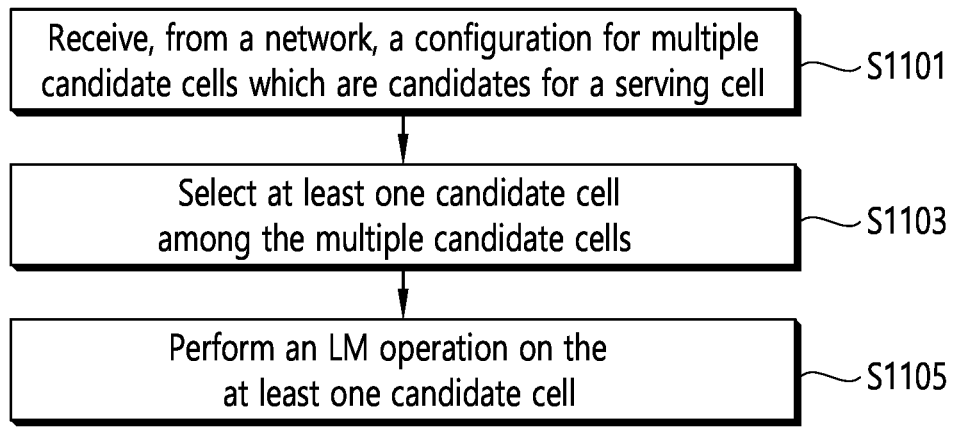
FIG. 11 shows an example of a method performed by a user equipment (UE) according to an embodiment of the present disclosure.

FIG. 11 shows an example of a method performed by a user equipment (UE) according to an embodiment of the present disclosure. The method may also be performed by a wireless device.

Referring to FIG. 11, in step S1101, the UE may receive, from a network, a configuration for multiple candidate cells which are candidates for a serving cell.

In step S1103, the UE may select at least one candidate cell among the multiple candidate cells.

In step S1105, the UE may perform an LM operation on the at least one candidate cell.

According to various embodiments, the UE may select the at least one candidate cell among the multiple candidate cells based on at least one of monitoring of a radio condition of one or more of the multiple candidate cells or selecting the at least one candidate cell among the multiple candidate cells based on an indication received from the network.

According to various embodiments, the UE may select at least one of a candidate cell or a candidate cell group (CG) to perform the LM operation based on the indication included in the configuration for the multiple candidate cells or an indication included in a network command to select a list of candidate cells or CGs to perform the LM operation.

According to various embodiments, the network command may comprise a media access control (MAC) control element comprising a field indicating whether to perform the LM operation on each of configured candidate cells or CGs or a field indicating which LM operation to apply on the selected candidate cell or candidate CG.

According to various embodiments, the configuration for the multiple candidate cells may comprise a configuration for multiple candidate CGs. The multiple candidate CGs may be candidates for a serving CG. Each candidate cell may correspond to a candidate CG comprising a candidate cell as a special cell configured for the LM operation or a non-special cell. The configuration for the multiple candidate CGs may comprise configuration parameters for each CG.

According to various embodiments, the UE may monitor a radio quality of one or more of the multiple candidate cells. The UE may select the at least one candidate cell among the multiple candidate cells based on the radio quality of one or more of the multiple candidate cells.

For example, the UE may select a single candidate cell with highest radio quality among the multiple candidate cells.

For example, the UE may select at least one candidate cell with radio quality exceeding a threshold.

For example, the UE may select N best candidate cell in terms of radio quality with the N configured by the network.

For example, the UE may select at least one candidate cell whose radio link quality is offset better than a current serving cell.

According to various embodiments, the UE may perform an LM operation on the at least one candidate cell while not performing an LM operation on one or more remaining candidate cells other than the at least one candidate cell among the multiple candidate cells.

According to various embodiments, the UE may determine a candidate cell to which the switching from a current serving cell is triggered based on cell switch execution condition included in the configuration for the multiple candidate cells or based on a network command triggering cell switch to the candidate cell. The UE may apply configuration parameters for the candidate cell.

According to various embodiments, the UE may detect a failure of a candidate cell among the at least one candidate cell based on the LM operation on the at least one candidate cell. The UE may transmit, to the network, information informing the failure of the candidate cell.

According to various embodiments, the UE may perform measurements of one or more reference signals to evaluate a quality of beams associated with the one or more reference signals for the at least one candidate cell based on the LM operation. The UE may detect a failure of one or more beams for the at least one candidate cell based on the measurements. The UE may transmit, to the network, information informing the failure of the one or more beams for the at least one candidate cell.

According to various embodiments, the UE may perform measurements of one or more reference signals to evaluate a quality of beams associated with the one or more reference signals for the multiple candidate cells. The UE may select the at least one candidate cell based on the measurements and transmit, to the network, information informing a measurement result of one or more reference signals for the at least one selected candidate cell.

According to various embodiments, the UE may perform uplink transmission on a cell of a candidate CG corresponding to the at least one candidate cell based on the LM operation.

According to various embodiments, the UE may receive uplink timing information for the candidate CG, in response to the uplink transmission. Upon triggering of a cell switch from a current serving cell to a candidate cell in the candidate CG, the UE may transmit a message based on whether the uplink timing information for the candidate CG timing is valid. The message may comprise an indication of a completion of the cell switch to the candidate cell or user data.

According to various embodiments, the UE may consider the uplink transmission timing for the candidate CG to be valid based on a timer associated to the candidate CG, wherein the timer starts upon reception of the uplink timing information. Upon expiry of the timer, the UE may consider the uplink transmission timing for the candidate CG to be invalid.

According to various embodiments, upon triggering of the cell switch from the current serving cell to the candidate cell, if the uplink transmission timing is valid, the UE may transmit a message based on the uplink timing information, and if the uplink transmission timing is invalid, the UE may transmit a message comprising an indication of a completion of the cell switch to the candidate cell or user data based on a random access.

According to various embodiments, the LM operation may comprise at least one of a radio link monitoring (RLM), a beam management or an uplink timing management for the at least one candidate cell.

According to various embodiments, the UE may perform measurements of one or more reference signals configured for the at least one candidate cell to detect a failure of a candidate cell based on the measurements. The detection of the failure may comprise a radio link failure detection or beam failure detection based on the one or more reference signals configured for the radio link failure or beam failure detection.

According to various embodiments, upon detection of the failure of the candidate cell, the UE may transmit, to the network, information indicating the failure. The information may comprise an identifier of the candidate cell or a measurement result of the one or more reference signals.

According to various embodiments, upon detection of the failure of the candidate cell, the UE may exclude the candidate cell from the at least one candidate cell as cell switching target from the serving cell.

Figure 12:
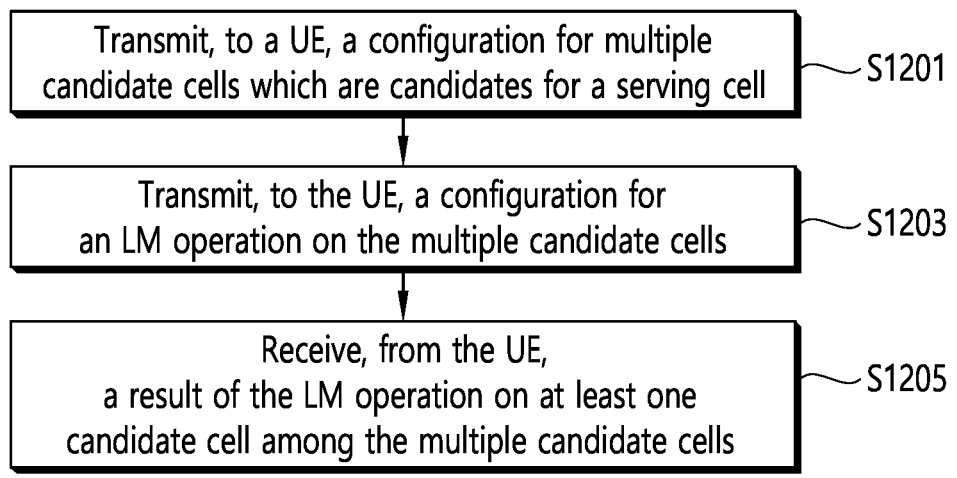
FIG. 12 shows an example of a method performed by a network node according to an embodiment of the present disclosure.

FIG. 12 shows an example of a method performed by a network node according to an embodiment of the present disclosure.

Referring to FIG. 12, in step S1201, the network node may transmit, to a UE, a configuration for multiple candidate cells which are candidates for a serving cell.

In step S1203, the network node may transmit, to the UE, a configuration for a link management (LM) operation on the multiple candidate cells.

In step S1205, the network node may receive, from the UE, a result of the LM operation on at least one candidate cell among the multiple candidate cells.

In FIG. 12, the at least one candidate cell may be selected among the multiple candidate cells based on a radio condition of one or more of the multiple candidate cells. The LM operation may be performed on the at least one candidate cell and not performed on one or more remaining candidate cells other than the at least one candidate cell among the multiple candidate cells. The result of the LM operation on the at least one candidate cell may comprise at least one of information informing a failure of a cell among the at least one candidate cell, or information informing that configuration parameters for a cell for which execution condition is satisfied among the at least one candidate cell is applied.

Hereinafter, selective LM with Cell Group selection and selective LM with Cell selection are described.

1. Selective LM with Cell Group Selection

In selective LM with cell group selection, UE may be configured with a list of CGs including at least one CG candidate and zero or more regular CG. UE may be configured with a list of LM configuration for each CG. UE may select zero or more CGs from the CG candidates, based on radio condition of the CG candidates and/or regular CG. UE may perform LM operation on the selected candidate CG by using the LM configuration applicable for the selected candidate CG.

Figure 13:
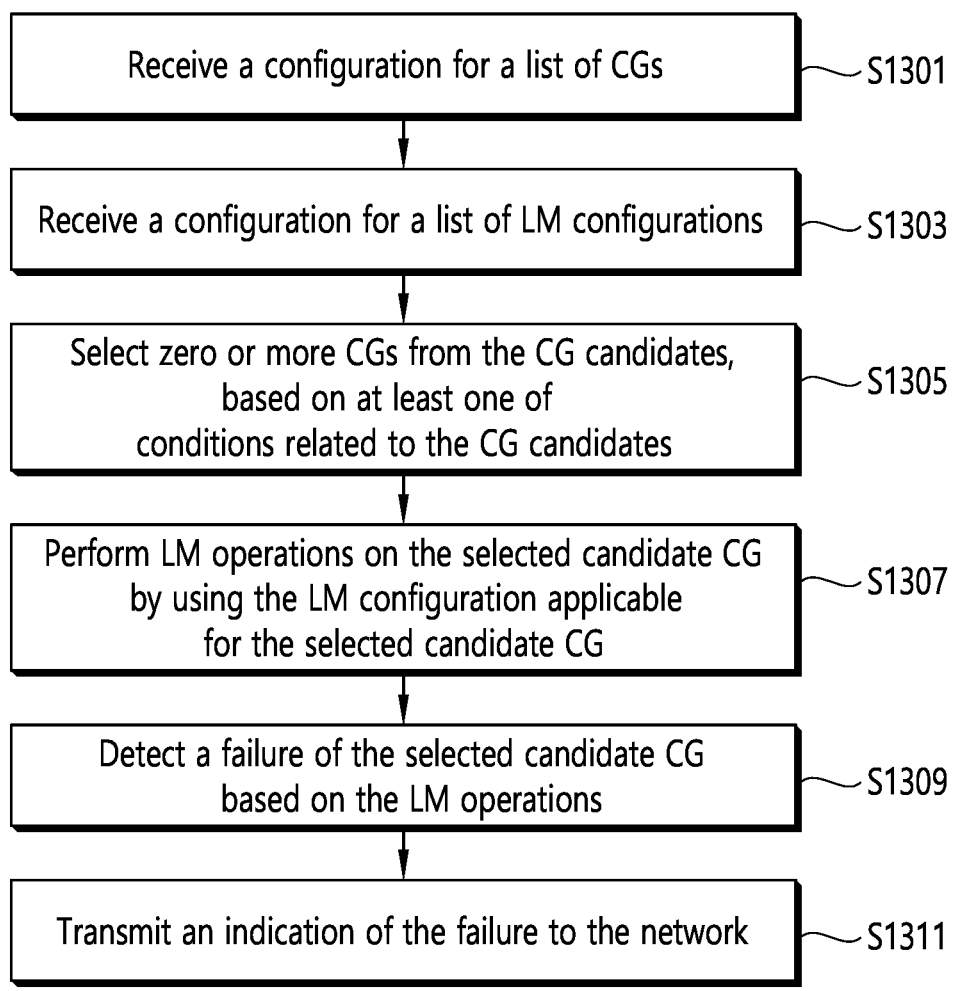
FIG. 13 shows an example of a method for a selective LM with cell group selection according to an embodiment of the present disclosure.

FIG. 13 shows an example of a method for a selective LM with cell group selection according to an embodiment of the present disclosure. The method may be performed by a UE and/or a wireless device.

Referring to FIG. 13, in step S1301, the UE may receive a configuration for a list of cell groups (CGs). That is, the UE may be configured with a list of CGs.

The list of CGs may comprise at least one MCG and zero or one or more SCGs and zero or more SCG candidates.

The UE may be configured with configuration parameters for each CG. For each SCG candidate, the UE may be configured with CG configuration parameters and corresponding execution condition. If the execution condition is met, the SCG candidate may become a new SCG, and the CG configuration parameters of the SCG is applied.

According to various embodiments, CG status may comprise a regular CG and/or a candidate CG. Regular SCG can be activated or deactivated based on network command or UE based condition. Candidate CG can be selected as regular CG, if applicable condition is met. Regular CG can become CG candidate if applicable condition is met. For example, if there is the constraint that only one regular SCG can be selected, if a SCG candidate becomes a new regular SCG, the previous regular SCG may become a SCG candidate. A certain candidate CG can be selected based on condition, and some extra link management operation may be performed on the selected candidate CG, compared to the non-selected candidate CG.

In step S1303, the UE may receive a configuration for a list of link management (LM) configurations. That is, the UE may be configured with a list of LM configurations.

Each LM configuration may comprise LM resource information and LM parameters. Each LM configuration may be associated with at least one CG in the CG list. For example, a certain LM configuration may be associated with selected CG (e.g., MCG or SCG). A certain LM may be associated with a CG candidate.

LM configuration may comprise RLM configuration. LM configuration may comprise beam failure detection (BFD) configuration. The RLM configuration may comprise RLM resources (e.g., RS information) and RLM parameters (e.g., counter, timer). The BFD configuration may comprise BFD resources (e.g., RS information) and BFD parameters (e.g., counter, timer). LM configuration may comprise parameters related to uplink timing management operation. For example, the uplink timing management operation may comprise an uplink signalling such as random access channel (RACH) signalling, including random access preamble transmission and/or message 3 PUSCH transmission. In this case, the parameters related to the uplink timing management operation may comprise RACH resources. For another example, the uplink timing management operation may comprise uplink reference signalling such as sounding reference signal (SRS).

The LM configuration may comprise separate LM resource information and LM parameters for regular CG status and candidate CG status respectively. The LM configuration may comprise common LM resource information and LM parameters applicable for both regular CG status and candidate CG status.

The LM configuration may comprise separate LM resource information and LM parameters for selected candidate CG status and non-selected candidate CG status respectively. The LM configuration may comprise common LM resource information and LM parameters applicable for both selected candidate CG status and non-selected candidate CG status.

In step S1305, the UE may select zero or more CGs from the CG candidates, based on at least one of conditions related to the CG candidates. For example, the conditions may comprise:

Condition1: a single CG of the highest radio quality based on e.g, RSRP/RSRQ/SINR is selected. Minimum radio quality constraint may be enforced such that only a CG whose radio quality exceeds a threshold can be selected.

Condition2: Any CG of the radio quality exceeding a threshold is selected. Maximum number of CGs that can be selected can be configured so that the number of selected CGs does not exceed UE capability.

Condition3: N best CGs based on radio quality are selected. N can be configured by network.

Condition4: The radio quality of the candidate CG is offset better than that of the regular CG associated with the candidate CG, if the regular CG is available.

For the measurement of the radio quality of a concerned CG, a certain cell (indicated cell or a special cell (SpCell) such as PCell and/or PSCell) within the CG can be monitored. Separate RS resources for such monitoring can be configured.

In step S1307, the UE may perform LM operations on the selected candidate CG by using the LM configuration applicable for the selected candidate CG.

If the LM configuration of the selected candidate CG is different from that of non-selected candidate CG, the UE may apply the LM configuration applicable for the selected candidate CG for the LM operation.

If the LM configuration is common for both selected candidate CG and non-selected candidate CG, the UE may apply the common LM configuration for the LM operation.

If the LM configuration of the CG includes RLM configuration, the UE may perform RLM operations based on the RLM configuration.

If the LM configuration of the CG includes beam management configuration, the UE may perform beam management operations based on the beam management configuration. For example, the UE may perform BFD operations. Beam failure recovery resource/configuration may be provided in the beam management configuration. If BF is detected, BFR is triggered based on the BFR resource/configuration.

If the LM configuration of the CG includes uplink (UL) timing management configuration, the UE may perform UL timing management operations. The UE may transmit UL signal periodically or in event based manner so that the UE can trigger network to send UL timing adjustment command when necessary. The UE may send UL signal when validity time of the current UL timing is about to expire. Or, the UE may send UL signal when validity time of the current UL timing expires. The UE may indicate to network via regular CG about its pending transmission of UL signal on the candidate CG, so that network can be ready to receive the UL signal. If the UE is configured with dedicated UL signal, the UE may transmit the UL signal. If the UE is not configured with dedicated UL signal or validity time of the current UL timing has already expired, the UE may transmit physical random access channel (PRACH) preamble or trigger random access (RA) procedure.

In step S1309, the UE may detect a failure of the selected candidate CG based on the LM operations. Then, in step S1311, the UE may transmit an indication of the failure to the network.

The UE may transmit a message indicating the failure of the selected candidate CG. For transmission of the message, UE may use a CG available for the transmission, where failure has not been detected for the available CG.

The UE may transmit a failure indication by using MCG resources (i.e., the message is sent on MCG) if:
 MCG is configured as CG for the transmission of the message;
 there is no regular SCG available for transmission of the message;
 failure on regular SCG has been detected; and/or
 a certain combination of the above conditions is met.

The UE may transmit a failure indication by using SCG resources (i.e., the message is sent on SCG) if:
 SCG is configured as CG for the transmission of the message;
 there is no regular MCG available for transmission of the message;
 failure on regular MCG has been detected; and/or
 a certain combination of the above conditions is met.

For example, UE may be configured with MCG, SCG, and two SCG candidates SCG1 and SCG2. The quality of SCG1 and SCG2 may not be good enough. Then, the UE does not perform link management operations on SCG1 and SCG2. Neither of SCG1 nor SCG2 becomes a regular SCG1, since their radio quality is not good enough relative to the configured SCG. After some time, UE may select SCG2 and perform link management operations only on the SCG2 while not performing link management operations on the SCG1. Then, SCG2 may become a regular SCG (via network command or based on condition), since the SCG2 radio quality is good enough and/or the CG status is stable enough. The SCG2 may immediately be ready for scheduling for DL/UL, because the SCG2 has no link failure, no beam failure and/or no UL timing misalignment. DL/UL transmission may be performed on the SCG2.

For another example, UE may be configured with multiple SCGs (e.g., SCG1, 2 and 3). All configured SCG may be deactivated. UE may select SCG1 and perform link management operations only on the selected SCG1 while not performing link management operations on the SCG2 and 3. In some cases, SCG1 may be activated (via network command or based on condition). UE may activate the SCG1 immediately, and the SCG1 may immediately be ready for scheduling for DL/UL, because the SCG1 has no link failure, no beam failure and/or no UL timing misalignment. DL/UL transmission may be initiated on the SCG1 immediately.

Based on the selective link management operations among the candidate CGs, link management operations may be concentrated on certain candidate CG(s) that is(are) more likely to become a regular CG. This means that link management operations are effectively avoided on candidate CGs that are less likely to become a regular CG. This would reduce UE power consumption significantly while still allowing UE to perform link management operations that are desirably considered necessary and beneficial.

2. Selective LM with Cell Selection

In selective LM with Cell selection, UE may be configured with a list of CGs/cells including at least one regular cell candidate and zero or more regular cell. UE may be configured with a list of LM configuration for each cell. UE may select zero or more cells from the cell candidates, based on radio condition of the cell candidates and/or regular cell. UE may perform LM operation on the selected candidate cell by using the LM configuration applicable for the selected candidate cell.

Figure 14:
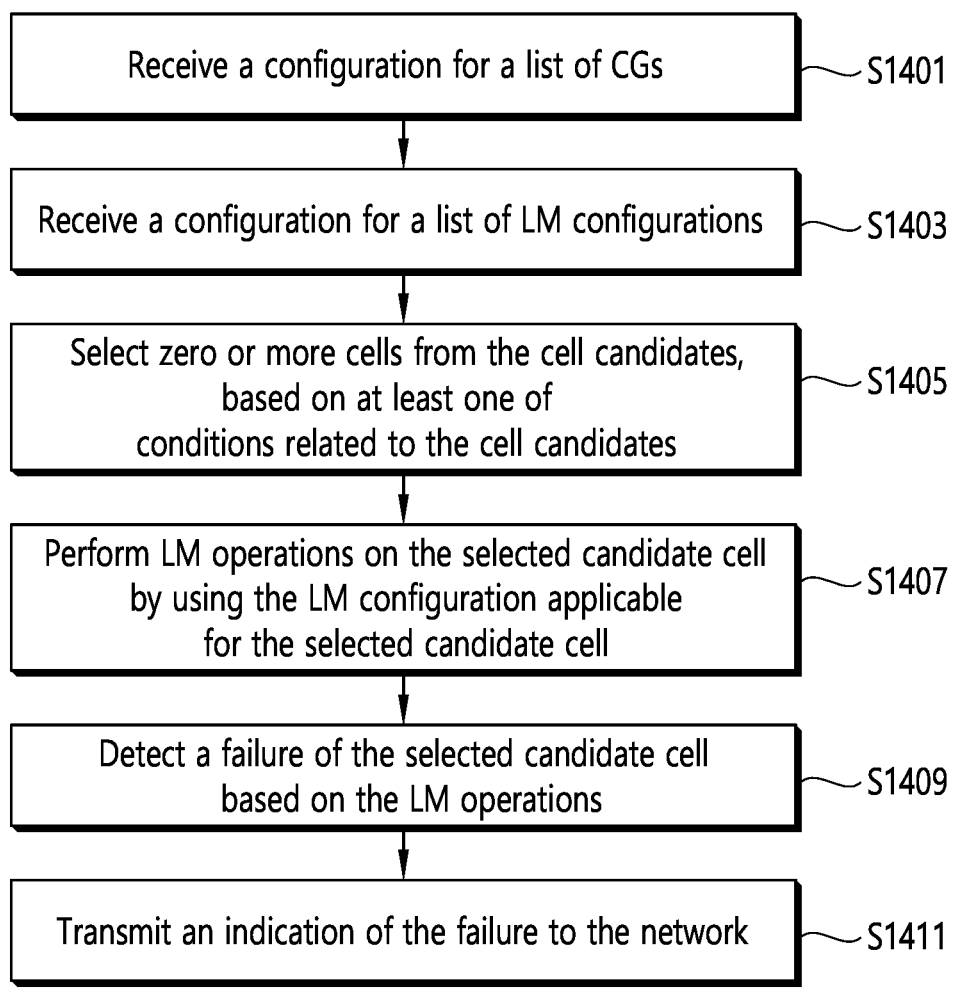
FIG. 14 shows an example of a method for a selective LM with Cell selection according to an embodiment of the present disclosure.

FIG. 14 shows an example of a method for a selective LM with Cell selection according to an embodiment of the present disclosure.

Referring to FIG. 14, in step S1401, in step S1401, the UE may receive a configuration for a list of cell groups (CGs). That is, the UE may be configured with a list of CGs.

The list of CGs may comprise zero or one representative cell and one or more cell candidates to become a representative cell. If there is zero representative cell within a CG, one candidate cell can become a representative cell of the CG. If there is already one representative cell within a CG, one candidate cell can become a representative cell of the CG by replacing the existing representative cell with the candidate cell.

The list of CGs may comprise at least one serving cell and one or more serving cell candidates. The list of CGs may comprise zero serving cell and one or more serving cell candidates. The list of CGs may comprise cells of the same frequency. The list of CGs may comprise cells of different frequencies.

The UE may be configured with configuration parameters for each candidate cell. For each candidate cell, the UE may be configured with cell configuration parameters and corresponding execution condition. If the execution condition is met, the candidate cell may become a new representative cell, and the cell configuration parameters of the cell may be applied.

Any cell can be classified into regular cell and candidate cell. Representative cell is included in the regular cell. The regular cell can be activated or deactivated based on network command or UE based condition. The candidate cell can be selected as regular cell, if applicable condition is met. The regular cell can become cell candidate if applicable condition is met. For example, if there is the constraint that only one regular cell can be selected, if a cell candidate becomes a new regular cell, the previous regular cell may become a cell candidate. A certain candidate cell can be selected based on condition, and some extra link management operation may be performed on the selected candidate cell, compared to the non-selected candidate cell.

In step S1403, the UE may receive a configuration for a list of link management (LM) configurations. That is, the UE may be configured with a list of LM configurations.

Each LM configuration may comprise LM resource information and LM parameters. Each LM configuration may be associated with at least one cell in the cell list. For example, a certain LM configuration may be associated with selected cell. A certain LM may be associated with a cell candidate.

LM configuration may comprise RLM configuration. LM configuration comprise BFD configuration. The RLM configuration may comprise RLM resources (e.g., RS information) and RLM parameters (e.g., counter, timer). The BFD configuration may comprise BFD resources (e.g., RS information) and BFD parameters (e.g., counter, timer). LM configuration may comprise parameters related to uplink timing management operation. For example, the uplink timing management operation may comprise an uplink signalling such as random access channel (RACH) signalling, including random access preamble transmission and/or message 3 PUSCH transmission. In this case, the parameters related to the uplink timing management operation may comprise RACH resources. For another example, the uplink timing management operation may comprise uplink reference signalling such as sounding reference signal (SRS).

The LM configuration may comprise separate LM resource information and LM parameters for regular cell status and candidate cell status respectively. The LM configuration may comprise common LM resource information and LM parameters applicable for both regular cell status and candidate cell status.

The LM configuration may comprise separate LM resource information and LM parameters for selected candidate cell status and non-selected candidate cell status respectively. The LM configuration may comprise common LM resource information and LM parameters applicable for both selected candidate cell status and non-selected candidate cell status.

In step S1405, the UE may select zero or more cells from the cell candidates, based on at least one of conditions related to the cell candidates. For example, the conditions may comprise:

Condition1: A single cell of the highest radio quality based on e.g, RSRP/RSRQ/SINR is selected. Minimum radio quality constraint may be enforced such that only a cell whose radio quality exceeds a threshold can be selected.

Condition2: Any cell of the radio quality exceeding a threshold is selected. Maximum number of cells that can be selected can be configured so that the number of selected cells does not exceed UE capability.

Condition3: N best cells based on radio quality are selected. N can be configured by network.

Condition4: The radio quality of the candidate cell is offset better than that of the regular cell associated with the candidate cell, if the regular cell is available.

In step S1407, the UE may perform LM operations on the selected candidate cell by using the LM configuration applicable for the selected candidate cell.

If the LM configuration of the selected candidate cell is different from that of the non-selected candidate cell, the UE may apply the LM configuration applicable for the selected candidate cell for the LM operation.

If the LM configuration is common for both selected candidate cell and non-selected candidate cell, the UE may apply the common LM configuration for the LM operation.

If the LM configuration of the cell includes RLM configuration, the UE may perform RLM operations on the cell based on the RLM configuration.

If the LM configuration of the cell includes beam management configuration, the UE may perform beam management operations on the cell based on the beam management configuration. For example, UE may perform BF detection operations. Beam Failure Recovery resource/configuration may be provided in the beam management configuration. If BF is detected, BFR is triggered based on the BFR resource/configuration.

If the LM configuration of the cell includes UL timing management configuration, the UE may perform UL timing management operations on the cell based on the UL timing management configuration. The may transmit UL signal periodically or in event based manner so that the UE can trigger network to send UL timing adjustment command when necessary. The UE may send UL signal when validity time of the current UL timing is about to expire. Or, the UE may send UL signal when validity time of the current UL timing expires. The UE may indicate to network via regular cell about its pending transmission of UL signal on the candidate cell, so that network can be ready to receive the UL signal. If the UE is configured with dedicated UL signal, the UE may transmit the UL signal. If the UE is not configured with dedicated UL signal or validity time of the current UL timing has already expired, the UE may transmit a PRACH preamble or trigger RA procedure.

In step S1409, the UE may detect a failure of the selected candidate cell based on the LM operations. Then, in step S1411, the UE may transmit an indication of the failure to the network.

The UE may transmit a message indicating the failure of the selected candidate cell. For transmission of the message, UE may use a cell available for the transmission, where failure has not been detected for the available cell.

The UE may transmit a failure indication by using a special cell (e.g., PCell) resources (i.e., the message is sent on a special cell) if:
 a special cell is configured as the cell for the transmission of the message;
 there is no regular non-special cell available for transmission of the message;
 failure on regular non-special cell has been detected; and/or
 a certain combination of the above conditions is met.

The UE may transmit a failure indication by using non-special cell resources (i.e., the message is sent on non-special cell such as SCell) if:
 non-special cell is configured as the cell for the transmission of the message;
 there is no regular special cell available for transmission of the message;
 failure on regular special cell has been detected; and/or
 a certain combination of the above conditions is met.

For example, UE may be configured with a regular serving cell and two cell candidate (e.g., cell 1, 2). The quality of cell 1 and cell 2 is not good enough. UE does not perform link management operations on cell 1 and cell 2. Neither of cell 1 nor cell 2 becomes a regular serving cell, since their radio quality is not good enough relative to the regular serving cell. After some time, cell2 quality becomes better than before and/or serving cell quality becomes worse than before. Then, UE may select cell2 and perform link management operations only on the cell2 while not performing link management operations on the cell1. Cell2 becomes a regular cell (via network command or based on condition), since the cell2 radio quality is good enough and/or the link status is stable enough. Cell2 may immediately be ready for scheduling for DL/UL, because the Cell2 has no link failure, no beam failure and/or no UL timing misalignment. DL/UL transmission may be initiated on the cell2 immediately.

For another example, UE may be configured with multiple cells (e.g., cell 1, 2, 3). All configured cells are deactivated. Cell1 quality may be higher than other cells. UE may select cell1 and perform link management operations only on the selected cell. Then, cell1 may be activated (via network command or based on condition). UE may activate the cell1 immediately, and the cell1 may immediately be ready for scheduling for DL/UL, because the cell1 has no link failure, no beam failure and/or no UL timing misalignment. DL/UL transmission may be performed on the cell1.

According to an embodiment of the present disclosure, network may configure UE with a subset of cell/CG candidates among configured cell/CG candidates so that UE is required to perform necessary link management operations only on the subset of cell/CG candidates. Network may indicate to the UE which link management operation should be performed. For example, network may indicate to the UE to perform a certain combination of RLM, BFD (i.e., beam monitoring operations), and TA management operations.

Furthermore, the method in perspective of the UE described above in FIG. 11 may be performed by first wireless device 100 shown in FIG. 2, the wireless device 100 shown in FIG. 3, the first wireless device 100 shown in FIG. 4 and/or the UE 100 shown in FIG. 5.

More specifically, the UE comprises at least one transceiver, at least processor, and at least one computer memory operably connectable to the at least one processor and storing instructions that, based on being executed by the at least one processor, perform operations.

The operations comprise receiving, from a network, a configuration for multiple candidate cells which are candidates for a serving cell; selecting at least one candidate cell among the multiple candidate cells; and performing a link management (LM) operation on the at least one candidate cell.

Furthermore, the method in perspective of the UE described above in FIG. 11 may be performed by a software code 105 stored in the memory 104 included in the first wireless device 100 shown in FIG. 4.

More specifically, at least one computer readable medium (CRM) stores instructions that, based on being executed by at least one processor, perform operations comprising receiving, from a network, a configuration for multiple candidate cells which are candidates for a serving cell; selecting at least one candidate cell among the multiple candidate cells; and performing a link management (LM) operation on the at least one candidate cell.

Furthermore, the method in perspective of the UE described above in FIG. 11 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus configured to operate in a wireless communication system (e.g., wireless device/UE) comprises at least processor, and at least one computer memory operably connectable to the at least one processor. The at least one processor is configured to perform operations comprising receiving, from a network, a configuration for multiple candidate cells which are candidates for a serving cell; selecting at least one candidate cell among the multiple candidate cells; and performing a link management (LM) operation on the at least one candidate cell.

Furthermore, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: transmitting, to a user equipment (UE), a configuration for multiple candidate cells which are candidates for a serving cell; transmitting, to the UE, a configuration for a link management (LM) operation on the multiple candidate cells; and receiving, from the UE, a result of the LM operation on at least one candidate cell among the multiple candidate cells. The at least one candidate cell may be selected among the multiple candidate cells based on a radio condition of one or more of the multiple candidate cells. The LM operation may be performed on the at least one candidate cell and not performed on one or more remaining candidate cells other than the at least one candidate cell among the multiple candidate cells. The result of the LM operation on the at least one candidate cell may comprise at least one of information informing a failure of a candidate cell among the at least one candidate cell, or information informing that configuration parameters for a candidate cell for which execution condition is satisfied among the at least one candidate cell is applied.

The present disclosure can have various advantageous effects.

For example, UE performs selective LM operations on at least part of cells/CGs so that power consumption can be reduced, and UE can perform mobility with lower power consumption.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
   receiving, from a network, a configuration related to multiple candidate cell groups (CGs);
   receiving, from the network, a radio link monitoring configuration;
   receiving, from the network, a timing alignment configuration;
   selecting a subset of CGs among the multiple candidate CGs;
   performing a link management (LM) operation only on the subset of CGs based on the radio link monitoring configuration and the timing alignment configuration related to the subset of CGs;
   performing an uplink transmission on the subset of CGs based on the LM operation;
   receiving uplink timing information for the subset of CGs in response to the uplink transmission; and
   upon triggering of a cell switch from a current CG to a CG in the subset of CGs, transmitting a message based on whether the uplink timing information for the subset of CGs is valid,
   wherein the message comprises information related to a completion of the cell switch to the CG or user data.

2. The method of claim 1, wherein selecting of the subset of CGs is based on monitoring of a radio condition of one or more of the multiple candidate CGs or based on an indication received from the network.

3. The method of claim 2, wherein the indication is included in the configuration related to the multiple candidate CGs or in a network command to select the subset of CGs.

4. The method of claim 3, wherein the network command comprises a media access control (MAC) control element comprising a field indicating whether to perform the LM operation on each of the multiple candidate CGs or a field indicating which LM operation to apply on the subset of CGs.

5. The method of claim 2, wherein each of the multiple candidate CGs comprises a special cell configured for the LM operation or a non-special cell, and
   wherein the configuration related to the multiple candidate CGs comprises configuration parameters for each of the multiple candidate CGs.

6. The method of claim 2, wherein monitoring of the radio condition comprises monitoring a radio quality of the one or more of the multiple candidate CGs, and
   wherein selecting of the subset of CGs is based on the radio quality of the one or more of the multiple candidate CGs.

7. The method of claim 6, wherein selecting of the subset of CGs comprises at least one of:
   selecting a single candidate CG with highest radio quality among the multiple candidate CGs;
   selecting at least one candidate CG with radio quality exceeding a threshold;
   selecting N best candidate CGs in terms of radio quality with the N configured by the network; or
   selecting at least one candidate CG whose radio link quality is offset better than a serving CG.

8. The method of claim 1, further comprising, based on a failure not being detected on the subset of CGs:
   determining a CG among the subset of CGs to which switching from a current CG is triggered based on cell switch execution condition included in the configuration related to the multiple candidate CGs or based on a network command triggering cell switch to the CG; and
   applying configuration parameters for the CG.

9. The method of claim 1, further comprising:
   detecting a failure of a CG among the subset of CGs based on the LM operation on the subset of CGs; and
   transmitting, to the network, information informing the failure of the CG.

10. The method of claim 1, further comprising:
    performing measurements of one or more reference signals to evaluate a quality of beams associated with the one or more reference signals for the subset of CGs based on the LM operation;
detecting a failure of one or more beams for the subset of CGs based on the measurements; and
transmitting, to the network, information informing the failure of the one or more beams for the subset of CGs.

11. The method of claim 1, further comprising:
considering uplink transmission timing for the subset of CGs to be valid based on a timer associated to the subset of CGs, wherein the timer starts upon reception of the uplink timing information; and
upon expiry of the timer, considering the uplink transmission timing for the subset of CGs to be invalid.

12. The method of claim 1, further comprising:
upon triggering of the cell switch from the current CG to the CG, if uplink transmission timing is valid, transmitting a message based on the uplink timing information, and if the uplink transmission timing is invalid, transmitting a message comprising an indication of a completion of the cell switch to the CG or user data based on a random access.

13. The method of claim 1, further comprising:
performing measurements of one or more reference signals to evaluate a quality of beams associated with the one or more reference signals for the multiple CGs,
wherein selecting of the subset of CGs is based on the measurement; and
transmitting, to the network, information informing a measurement result of one or more reference signals for the subset of CGs.

14. The method of claim 1, further comprising:
performing measurements of one or more reference signals configured for the subset of CGs to detect a failure of a CG based on the measurements, wherein the detection of the failure comprises a radio link failure detection or beam failure detection based on the one or more reference signals configured for the radio link failure or beam failure detection.

15. The method of claim 14, further comprising
upon detection of the failure of the CG, transmitting, to the network, information indicating the failure, wherein the information comprises an identifier of the CG or a measurement result of the one or more reference signals.

16. The method of claim 14, further comprising:
upon detection of the failure of the CG, excluding the CG from the subset of CGs as cell switching target from a serving CG.

17. The method of claim 1, wherein a User Equipment (UE) is in communication with at least one of a mobile device, a network, or autonomous vehicles other than the UE.

18. A wireless device comprising:
at least one transceiver;
at least one processor; and
at least one memory operably connectable to the at least one processor and storing instructions that, based on being executed by the at least one processor, perform operations comprising:
receiving, via the at least one transceiver from a network, a configuration related to multiple candidate cell groups (CGs);
receiving, via the at least one transceiver from the network, a radio link monitoring configuration;
receiving, via the at least one transceiver from the network, a timing alignment configuration;
selecting a subset of CGs among the multiple candidate CGs;
performing a link management (LM) operation only on the subset of CGs based on the radio link monitoring configuration and the timing alignment configuration related to the subset of CGs;
performing an uplink transmission on the subset of CGs based on the LM operation;
receiving uplink timing information for the subset of CGs in response to the uplink transmission; and
upon triggering of a cell switch from a current CG to a CG in the subset of CGs, transmitting a message based on whether the uplink timing information for the subset of CGs is valid,
wherein the message comprises information related to a completion of the cell switch to the CG or user data.

* * * * *